United States Patent [19]

Wilson et al.

[11] Patent Number: 5,537,052
[45] Date of Patent: Jul. 16, 1996

[54] SYSTEM AND METHOD FOR EXECUTING ON BOARD DIAGNOSTICS AND MAINTAINING AN EVENT HISTORY ON A CIRCUIT BOARD

[75] Inventors: Robert Wilson, Hopkinton; Harold F. Pritoni, Jr., Medfield, both of Mass.

[73] Assignee: EMC Corporation, Hopkinton, Mass.

[21] Appl. No.: 261,817

[22] Filed: Jun. 17, 1994

[51] Int. Cl.$^6$ .................................................. G01R 31/02
[52] U.S. Cl. .................... 324/763; 371/22.5; 371/22.6; 364/570; 364/580
[58] Field of Search .................................. 364/580, 579, 364/571.04, 571.08, 570; 324/764, 763, 537; 371/22.5, 22.6; 437/8; 340/635, 653

[56] References Cited

U.S. PATENT DOCUMENTS

| | | | |
|---|---|---|---|
| 4,556,840 | 12/1985 | Russell | 324/73 R |
| 4,580,066 | 4/1986 | Berndt | 307/276 |
| 4,625,310 | 11/1986 | Mercer | 371/15 |
| 4,628,217 | 12/1986 | Berndt | 307/467 |
| 4,703,484 | 10/1987 | Rolfe et al. | 371/25 |
| 4,711,024 | 12/1987 | Russell | 26/832 |
| 4,744,084 | 5/1988 | Beck et al. | 371/23 |
| 4,808,915 | 2/1989 | Russell | 324/73 R |
| 4,918,378 | 4/1990 | Katirioglu et al. | 365/201 |
| 4,937,827 | 6/1990 | Beck et al. | 371/23 |
| 5,027,355 | 6/1991 | Stoica | 371/22.1 |
| 5,029,166 | 7/1991 | Jarwala et al. | 371/22.1 |
| 5,029,171 | 7/1991 | Lee et al. | 371/27 |
| 5,056,093 | 10/1991 | Whetsel | 371/22.3 |
| 5,084,874 | 1/1992 | Whetsel, Jr. | 371/22.3 |
| 5,121,394 | 6/1992 | Russell | 371/22.1 |
| 5,132,974 | 7/1992 | Rosales | 371/22.3 |
| 5,173,906 | 12/1992 | Dreibelbis | 371/22.5 |
| 5,208,530 | 5/1993 | El-Ayat et al. | 324/158 R |
| 5,210,701 | 5/1993 | Hana et al. | 364/491 |
| 5,311,120 | 5/1994 | Bartholomew | 324/754 |
| 5,343,144 | 8/1994 | Kobayashi | 371/22.5 |
| 5,399,505 | 3/1995 | Dasse | 437/8 |

*Primary Examiner*—Kenneth A. Wieder
*Assistant Examiner*—Kourosh Cyrus Khosravi
*Attorney, Agent, or Firm*—Weingarten, Schurgin, Gagnebin & Hayes

[57] ABSTRACT

A system and method for executing on board diagnostics in connection with automated test hardware and maintaining an event history on a circuit board having a microprocessor and diagnostic routines stored in read only memory (ROM). The testing of a circuit board by automated test equipment causes a microprocessor on the circuit board to execute the diagnostic routines stored in read only memory on the circuit board. Upon completion of the diagnostic routines, the results generated by the routines are stored in non-volatile memory (NVRAM) on the circuit board. Upon completion of the remaining circuit board testing, the results of that testing are also written to the non-volatile memory on the circuit board. Other events occurring during in the production and use of the circuit board may also be written to the non-volatile memory on the circuit board to maintain a log for diagnostic and statistical purposes.

4 Claims, 5 Drawing Sheets

SYSTEM AND METHOD FOR EXECUTING ON BOARD DIAGNOSTICS AND MAINTAINING AN EVENT HISTORY ON A CIRCUIT BOARD

FIELD OF THE INVENTION

The invention relates generally to the field of circuit board testing and more specifically to on board diagnostics.

BACKGROUND OF THE INVENTION

Automated testing equipment (ATE) is used to test a circuit board during the manufacturing process. A circuit board to be tested is placed on the ATE such that a plurality of conducting pins of the ATE, referred to generally as a "bed of nails", are brought into contact with selected portion of etch or selected terminals of the various devices mounted on the circuit board. Electrical signals are applied to various ones of the pins in electrical contact with various ones of the devices and the resulting signals from those devices are monitored at other locations by various other pins. In this manner, the effect of a known signal applied by the ATE to a device or group of devices can be compared to the expected effect. If the device or group of devices fails to respond in the expected manner, a defect is indicated.

In addition to ATE component testing, environmental testing in which the circuit board is operated at its voltage limits while at its temperature limits may be performed during the manufacturing process. Circuit boards which fail to perform as expected while at parameter limits permitted by their design specifications must also be reworked or classified accordingly.

In addition to testing during manufacture, complex circuit boards, such as disk controllers, include a microprocessor which not only executes a program to provide the desired functionality, but also executes diagnostic routines stored in ROM on the circuit board to test the functionality of the circuit board during system initialization, once the circuit board has been installed in an operational computer system. Thus, for example, a microprocessor on a disk controller board performs the function of controlling a disk and also performs diagnostic tests to test the functionality of the controller board itself and the functionality of the disks which are attached to the controller board.

When a board is diagnosed as defective by the ATE component testing, the on board diagnostic testing, or any of other tests which are performed during and subsequent to the manufacturing process, the circuit board is either rejected or reworked. When a circuit board is reworked, the circuit board along with all its test results are brought to technicians who review the test results and determine the cause of the problem. The problems associated with this process are many fold. It is desirable, for example, to execute the on board diagnostics prior to the final assembly of the system to avoid the expense of assembling a system with defective circuit boards. Further, maintaining a paper history of the circuit board provides a logistical problem. Finally, it is desirable to maintain a record of each circuit board even once the circuit board has been delivered to a customer so that statistical information as well as information on problems experienced by the customer can be examined.

It is therefore desirable to have a testing system that will permit the execution of on board diagnostics during board manufacture while maintaining a historical record of the significant diagnostic events on the circuit board itself.

SUMMARY OF THE INVENTION

The invention relates to a system and method for executing on board diagnostics and maintaining an event history on a circuit board. In one embodiment, the testing of a circuit board by ATE causes a microprocessor on the circuit board to execute diagnostic routines stored in ROM on the circuit board. Upon completion of a diagnostic routine, the result generated by the routine is stored in non-volatile memory, NVRAM, on the circuit board. Upon completion of ATE component testing, the result of that testing is also written to the NVRAM on the circuit board. Other significant events occurring in the production and use of the circuit board may also be written to the NVRAM on the circuit board to thereby maintain a history of the circuit board for diagnostic and statistical purposes.

DESCRIPTION OF THE DRAWINGS

The above and further advantages of this invention may be better understood by referring to the following description taken in conjunction with the accompanying drawing, in which.

DETAILED DESCRIPTION OF THE INVENTION

Figure 1:
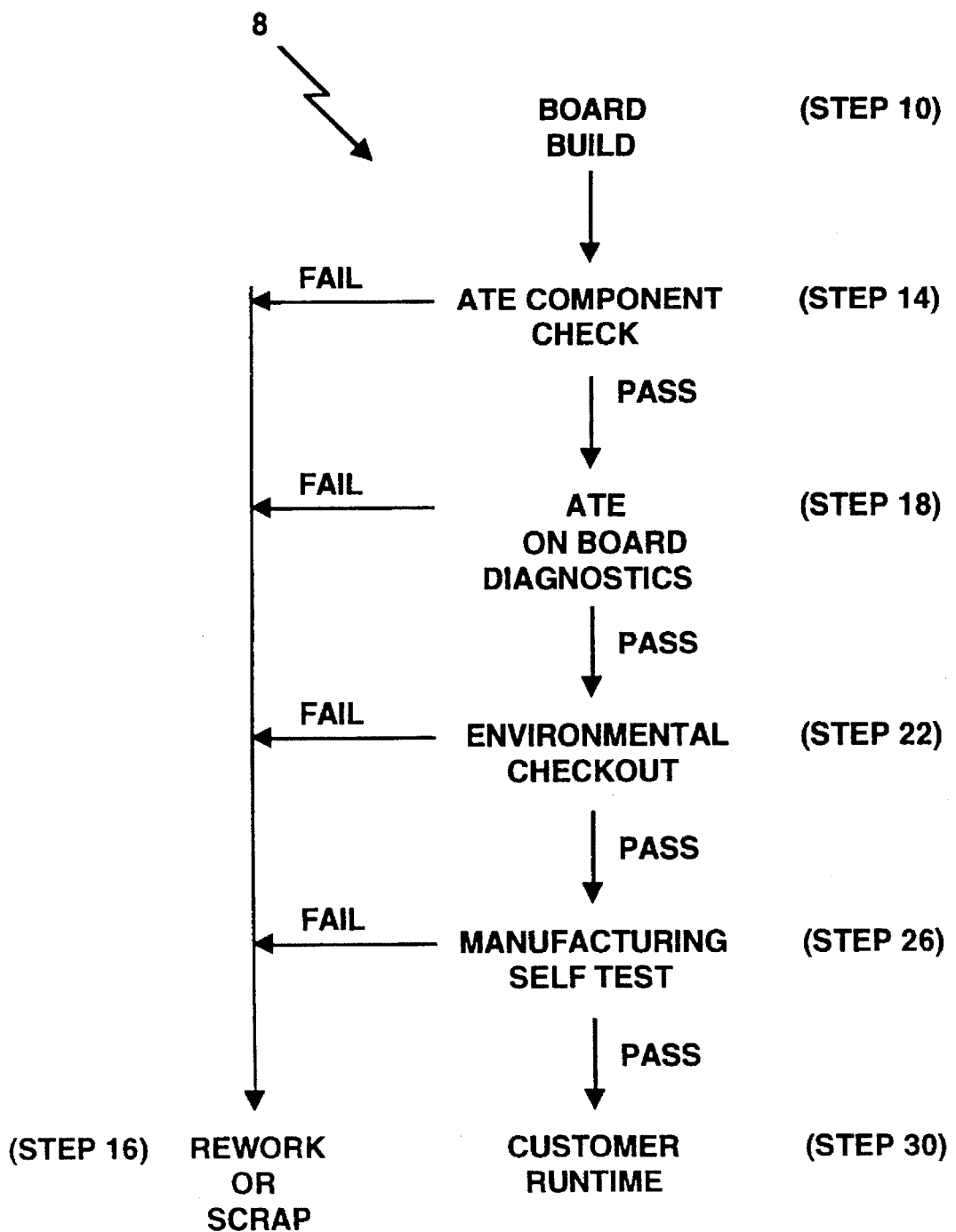
FIG. 1 depicts a timeline incorporating the teachings of the invention, for the production, testing and use of a circuit board.

In brief overview, a circuit board experiences certain events, which may be described on a timeline 8, relating to the manufacture and testing of the circuit board prior to its shipment to a customer and the circuit board's use thereafter by the customer. One such timeline 8 is shown in FIG. 1.

It should be noted that although each event, for example ATE component testing (Step 14), is shown as a single point on the timeline 8, each such event is actually a timeline itself extending from the main timeline 8, since each event represents a sequence of actions in time. For example, the event related to ATE component testing (Step 14) is actually a sequence of individual component and connection tests. However, for the purposes of the present discussion, the events are treated as single points on the timeline 8.

During at least one of the events on the timeline 8, prior to the shipment of the circuit board to the customer, the circuit board's on board diagnostic routines are executed and the circuit board tested. The result of the testing of the circuit board for each event in the timeline is recorded in the circuit board's NVRAM for later analysis.

Considering each event in the timeline 8 individually, once the circuit board is manufactured (Step 10), the circuit board is placed on an ATE and its components exercised (Step 14). ATE component testing is typically the first time that power is supplied to the fully assembled circuit board. The circuit board is tested with the ATE by placing the circuit board in contact with the "bed of nails" of the ATE. Once the bed of nails is in contact with the circuit board, signals are applied by the ATE to various test points, etch, and components to detect faults resulting from either the manufacturing process or defective components. If an error is detected during this testing, the ATE directly writes, by way of the "bed of nails", an identification representative of the error into the NVRAM located on the circuit board. If the circuit board fails ATE component testing, the circuit board is either rejected or reworked (Step 16).

If the circuit board passes ATE component testing (Step 14), data is written into the circuit board's NVRAM to indicate this event, and the ATE applies power to the circuit board and causes the circuit board to execute its on board diagnostics (Step 18). In one embodiment, the ROM based diagnostic routine senses the presence of the "bed of nails" of the ATE by detecting the presence of a specific ATE pin in an asserted state during this test. This feature allows the diagnostic routines to execute certain diagnostic functions only when the circuit board is in the ATE fixture.

The ROM based diagnostic routines execute and attempt to run to completion. If the diagnostic routines do not complete, an error has occurred. Whether the diagnostic routines complete or not, the diagnostic routines update the NVRAM to indicate either the condition which caused the failure or the fact that the test was successfully completed.

Further, the ROM based diagnostic routines, in one embodiment, communicate with the ATE by way of multiple "visibility points", locations on the board from which data can be read by the ATE. These locations may be read simultaneously by the ATE thereby permitting the transfer of multiple bits to the ATE at one time. These visibility points, in one embodiment, are implemented to read a memory mapped I/O register on the circuit board. The diagnostic routines are able to write to this register and hence can transmit information to the ATE. Either the failure or the successful completion of the diagnostic routines can thus be read by the ATE and the ATE operator notified to take appropriate action. Again if the circuit board fails to pass this testing, it is sent for rework or disposal (Step 16).

If the circuit board passes both the ATE component testing (Step 14) and the on board diagnostic testing (Step 18), the circuit board then may undergo environmental testing (Step 22). In environmental testing (Step 22), referred to as HASS testing, the circuit board is placed in a special test fixture, which asserts a signal on one of the contacts of the circuit board to inform the applicable diagnostic routine that the circuit board is in the HASS test fixture. As the HASS tests are executed, the circuit board is subject to thermal and voltage variations at the limits permitted by the specification. The HASS test fixture includes a computer which communicates with the circuit board through an RS232 interface. The HASS computer receives the test results from the circuit board and stores the results of each test on a hard disk attached to the HASS computer for further analysis.

During HASS testing, an expanded set of diagnostic routines which include routines which utilize loop back capabilities of the HASS fixture are executed as power-up diagnostics in response to commands issued by the HASS computer through the RS232 interface. Errors detected by the on board diagnostic routines or information indicative of the successful completion of the testing, are written to NVRAM as discussed previously. Also, as discussed previously, a failure in the environment testing (Step 22) results in the circuit board being disposed of or reworked (Step 16).

Once the circuit board has passed each of the board level tests, the circuit board is assembled into a computer system and the computer system, as a whole, undergoes manufacturing self test (MST) (Step 26). MST is the final testing of the circuit board prior to shipment of the entire computer system to a customer. The circuit board at this stage is integrated into a fully functional system with all the components to be delivered to the customer. The MST diagnostic routines are a superset of the diagnostic routines used in HASS testing. The functional subroutines are loaded under instructions from the ROM code and it is this loaded software which causes the circuit board to function when the circuit board is connected to a customer's system. MST is typically intended to run at a manufacturing facility. Once the MST testing is completed, the circuit board's NVRAM will be updated to accurately reflect MST test results. Circuit boards which fail to pass this system test are sent for rework or disposal (Step 16). If the system passes the system test (Step 26), the system is sent to the customer.

Once the computer system is in the possession of a customer, each time the computer system is initialized, diagnostic routines, either on board, or from the system initialization code, are executed (Step 30) and any errors are reported to the computer system operator. Errors that occur at this time are typically reported to field service technicians, who replace the failing circuit board and send the failing circuit board back to the manufacturer for repair.

Figure 2:
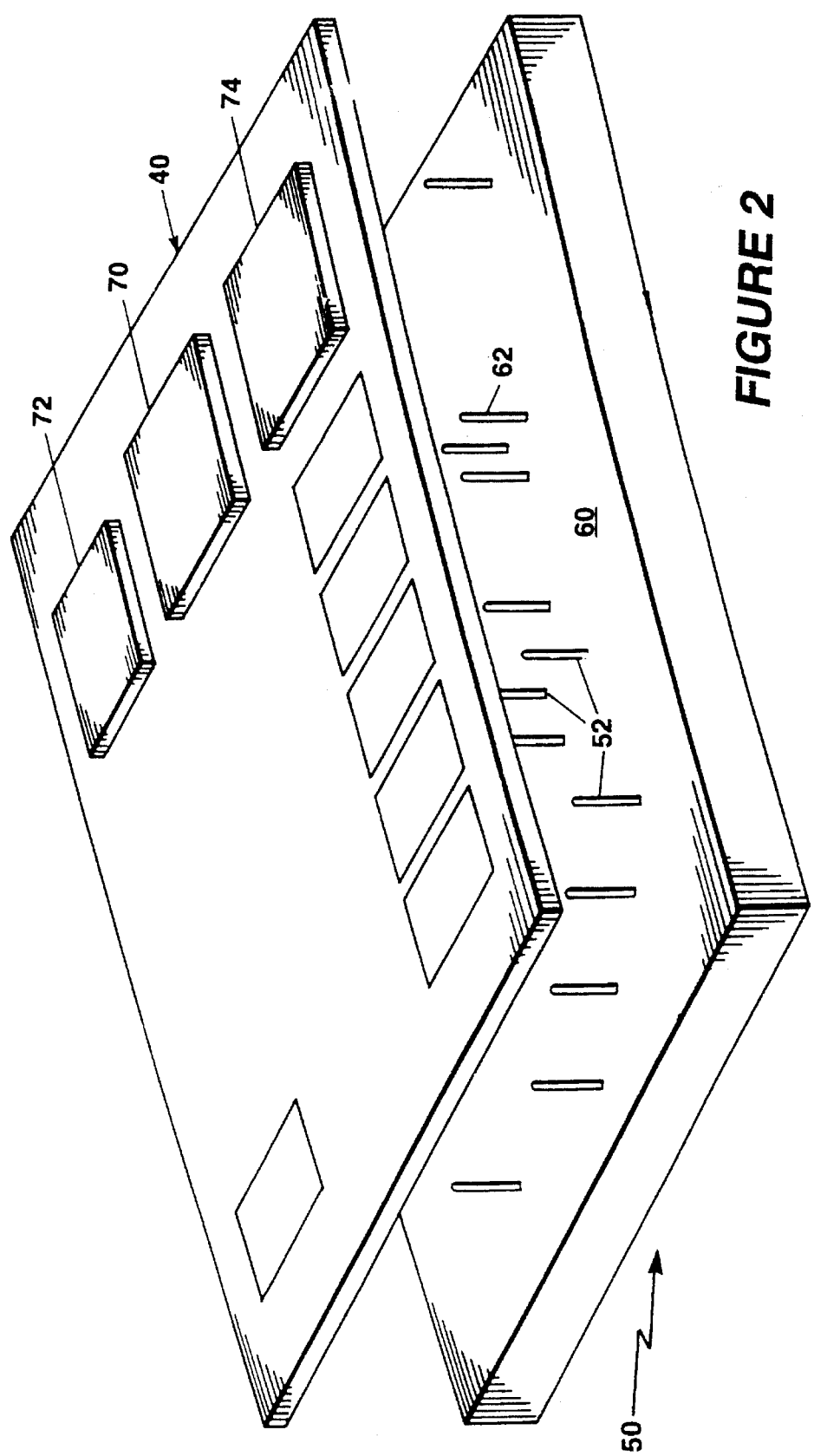
FIG. 2 depicts a diagrammatic perspective view of an ATE "bed of nails" with a circuit board.

Considering Steps 14 and 18 in more detail, and referring to FIG. 2, a circuit board 40 is placed in the ATE in what is termed a fixture 50, and the etch and terminals make contact with pins 52 of a "bed of nails" 60. In one embodiment, the presence of at least one predefined pin 62 of the "bed of nails" in an asserted state is detected by a microprocessor 70 on the circuit board 40. The ATE removes power from the circuit board and then reapplies power to the circuit board. Upon powerup, asserted pin 62 is detected by microprocessor 70 which then executes the appropriate on board diagnostic routines stored in ROM 72. Although in this embodiment the state of one pin is used to indicate the presence of the ATE, multiple pins can be used to indicate the presence of the circuit board in other fixtures.

Figure 3:
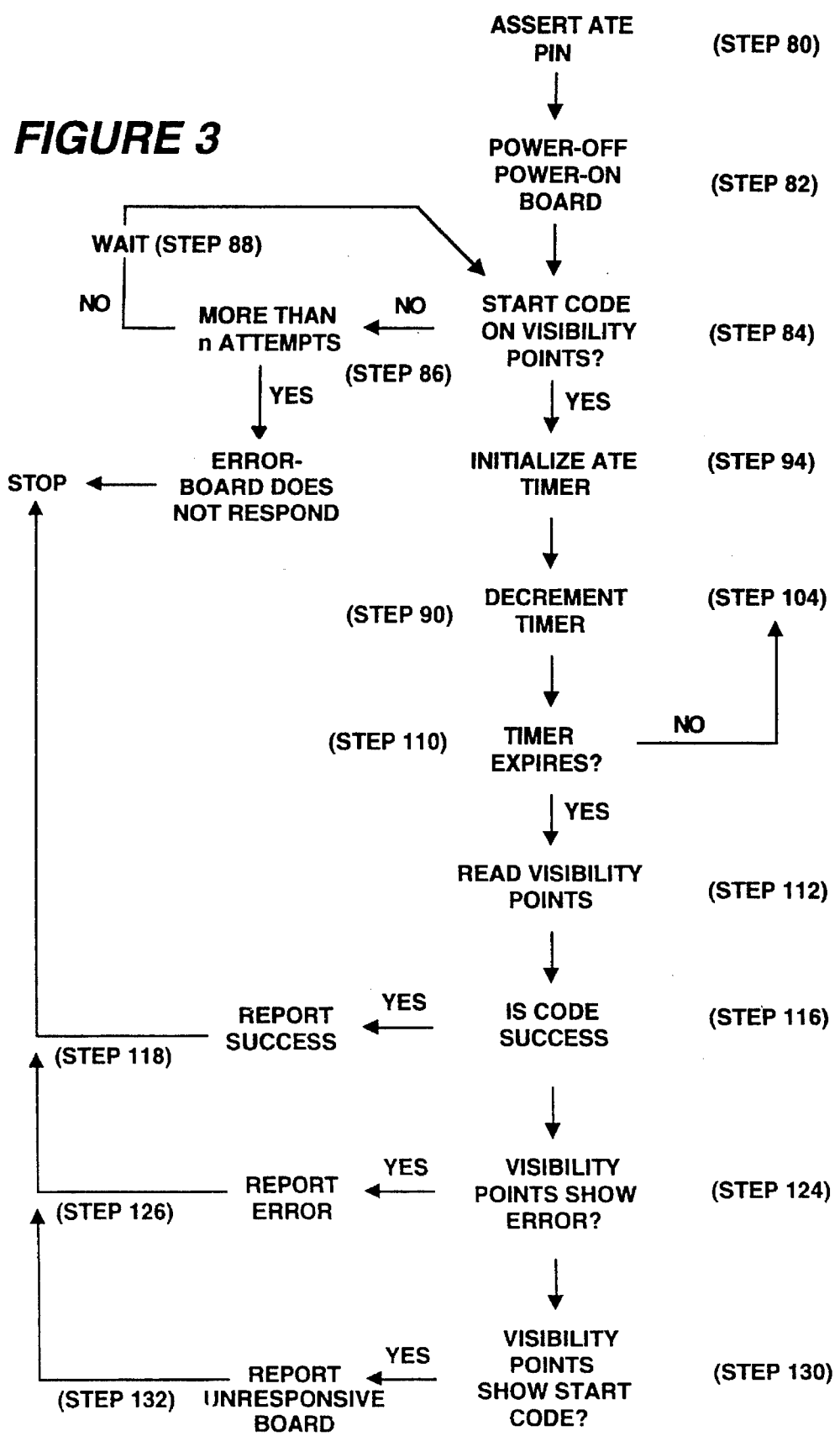
FIG. 3 is a flow chart of a program executed by the ATE to initiate on board diagnostic routines for a circuit board.

When the ATE has completed its component testing (Step 14, FIG. 1), the ATE causes the on board diagnostic routines to be executed. An embodiment of this program is shown in FIG. 3. More specifically, the ATE begins by asserting a signal (Step 80) on pin 62, to alert the circuit board that it is present in an ATE. The ATE then removes power from and reapplies power to the circuit board (Step 82). In response to the power off—power on sequence, the ATE expects to read a START_CODE on the visibility points (Step 84) indicating that the diagnostic testing has begun and if no such START_CODE is present on the visibility points, the ATE determines if more than a predetermined number of attempts to read the START_CODE have been made (Step 86). If less than the predetermined number of attempts have been made, the ATE will wait a predetermined amount of time (Step 88) and then again attempt to read the START_CODE at the visibility points (Step 84). The ATE will repeat this process until the START_CODE is present or until the ATE has made a predetermined number of attempts. If no START_CODE is present when the ATE has made the last of the predetermined number of attempts, the ATE reports the error condition (Step 90).

Once the START_CODE is present on the visibility points, the ATE sets an internal timer (Step 94) to reflect the amount of time required for the circuit board 40 to successfully execute the on board diagnostic routines. The ATE then decrements the internal timer (Step 104) and determines if the time allotted for the test has expired (Step 110). If the time elapsed is not the full time allotted, the timer is further decremented (Step 104) and this loop is repeated until the allotted time is completed.

Once the time allotted for the completion of the on board diagnostic routines has expired, the ATE again reads the visibility points (Step 112) and determines if the visibility points indicate that the on board diagnostic routines have completed successfully (Step 116) and if so, provides an indication of such successful completion to the ATE operator (Step 118). Conversely, if the visibility points indicate anything other that the successful completion of the testing, the ATE reports a test failure. Thus, if the ATE reads the failing test number from the visibility points (Step 124), the ATE reports the failing test number to the ATE operator (Step 126). Similarly, if the visibility points indicate the initial START_CODE (Step 130), indicating that the circuit board failed to execute the first of the diagnostic subroutines, the ATE reports this fact to the operator (Step 132).

Figure 4:
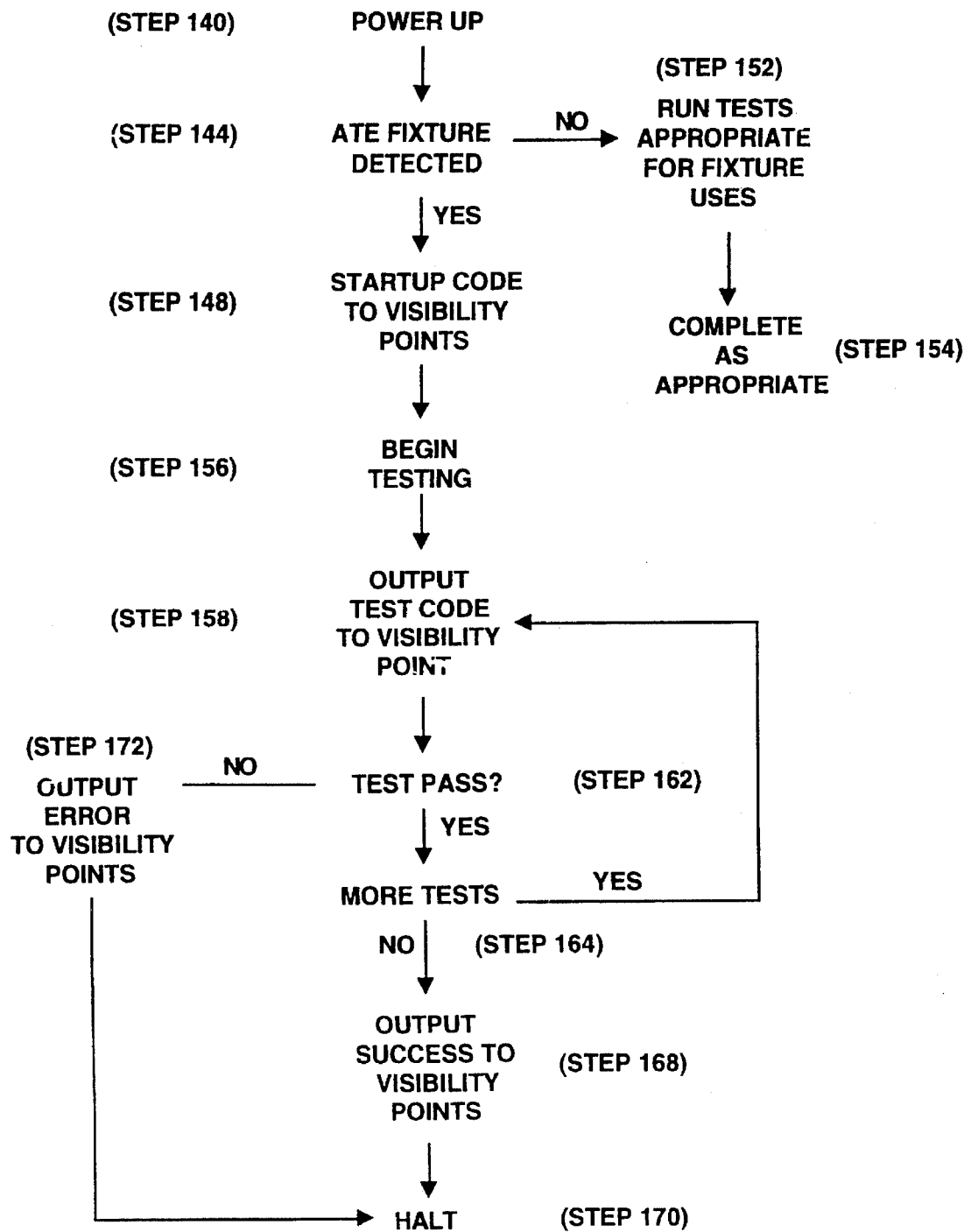
FIG. 4 is a flow chart of an embodiment of a program executed by the circuit board in response to the program executed by the ATE as shown in FIG. 3.

Referring to FIG. 4, if the microprocessor 70 on circuit board 40, upon power-up (Step 140) senses the presence of the ATE fixture (Step 144), the microprocessor 70 writes a START_CODE, for example all 1's, to the visibility points (Step 148). If the microprocessor 70 does not detect the presence of an ATE fixture upon power-up, the microprocessor 70 commences execution of the on board diagnostic routines which are suitable for the fixture in which the circuit board is positioned (Step 152). For example, if the circuit board is not within any fixture when powerup occurs, the microprocessor 70 runs diagnostics appropriate for a circuit board located within a computer system. Upon successful completion of the diagnostic routines or upon the failure of the diagnostic routines, the microprocessor 70 reports the success or failure as appropriate (Step 154).

Once the START_CODE is written to the visibility points (Step 148), the microprocessor 70 then begins testing (Step 156) by writing the number of the current diagnostic routine being executed to the visibility points (Step 158). Thus if the circuit board were to fail any diagnostic test by causing the microprocessor 70 to halt, the diagnostic routine which caused the circuit board to fail will appear on the visibility points.

The microprocessor 70 then determines if the diagnostic routine has completed successfully (Step 162) and if it has, determines whether there is another diagnostic routine within the set of diagnostic routines to be executed (Step 164). If another diagnostic routine needs to be executed, the diagnostic routine loop repeats, by again placing the number of the current diagnostic routine being executed to the visibility points (Step 158. If there are no further tests, the microprocessor 70 writes a diagnostic routine completion code to the visibility points (Step 168) and halts (Step 170).

If the microprocessor 70 determines that the diagnostic routine being executed failed (Step 162), the microprocessor 70 writes the failure code specific to that diagnostic routine to the visibility points (Step 172). Once the diagnostic failure code has been written to the visibility points, the microprocessor halts (Step 170).

Figure 5:
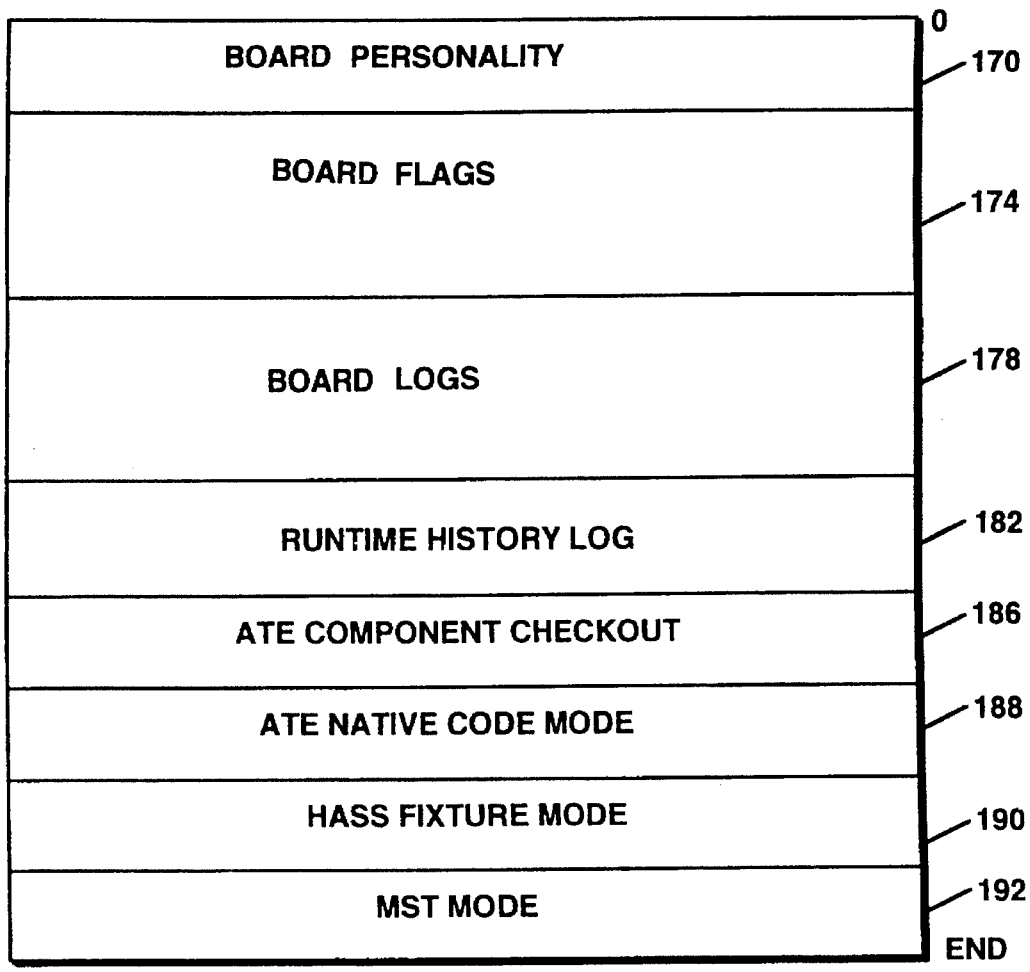
FIG. 5 is a memory table illustrating partitioning of NVRAM for storage of the results of the testing of the circuit board.

Subsequent to each of the testing operations, ATE, HASS etc., the result of the testing is written to the NVRAM 74 located on the circuit board 40. Referring to FIG. 5, the NVRAM memory space is partitioned into a number of sections 170, 174, 178, 182, 186, 188, 190, 192. A number of these sections are dedicated storage areas for the results of the various diagnostic tests: ATE Component Testing 186, ATE on board diagnostic testing 188, HASS testing 190, MST 192, and Customer Run-time History 182. The remaining sections, in one configuration, are used to store: the personality of the circuit board (170), for example the serial number, the board type, and revision level; board flags (174), for example, whether a disk controller board is in a mirrored configuration; and board logs (178), for example, error events. Sections may be added or deleted as is necessary for the needs of the circuit board whose history is being maintained.

In one embodiment, each section not only contains the results of the tests which were executed, but also a time stamp indicating when that particular test was performed. The time stamp function may be provided by a non-volatile time-of-year (TOY) clock which is set by the ATE equipment when power is first applied to the board. The TOY clock is maintained through the use of an on board battery.

Each section of the log may be configured as a circular log capable of maintaining n entries for detailing any significant events which occurred during the particular manufacturing test or the customer use of the circuit board 40. Again, any significant events logged include a time stamp as to when the event occurred. Such events include, but are not limited to, failure in a power-up diagnostic, unexpected system interrupt, failure in an MST function, SCSI bus exception, disk failure or error, run-time system timeout, or run-time system fatal error, as determined by the functionality of the circuit board used. The diagnostic routines are able to distinguish between ATE component tests, HASS tests, ATE on board diagnostic tests and normal power-up sequences so the diagnostic routines correctly write significant events to the appropriate sections of NVRAM.

The Customer Run-time History Log 182 is used to record problems which occur while the circuit board is in use within customer's computer system. This exception record is independent of any other error logging facility maintained by the customer.

Having shown the preferred embodiment, those skilled in the art will recognize that variations of the novel concepts described herein are possible. Therefore, it is the intention to limit the invention only as indicated by the scope and spirit of the appended claims.

What is claimed is:

1. A method for initiating execution of diagnostic routines on a circuit board comprising the steps of:

detecting a signal which is indicative that said circuit board is electrically interconnected to test equipment;

in response to the detection of said signal, initiating execution of a first diagnostic routine by a microprocessor on said circuit board to test the functionality of said circuit board; and in response to a failure to detect said signal, initiating execution of a second diagnostic routine by said microprocessor on said circuit board to test the functionality of said circuit board.

2. The method of claim 1 wherein said test equipment is Automated Test Equipment having a bed of nails and the step of detecting said signal comprises the step of detecting an assertion of a pin on said bed of nails.

3. The method of claim 2 wherein following the execution of said first or second diagnostic routine, said Automated Test Equipment determines whether said first or second diagnostic routine completed successfully.

4. The method of claim 3 wherein the result of said execution of said first or second diagnostic routine is written into non-volatile memory on said circuit board.

* * * * *